United States Patent [19]

Compton

[11] 4,143,517

[45] Mar. 13, 1979

[54] THERMAL ENGINE

[76] Inventor: Elmer Compton, 6038 W. Catalina, Phoenix, Ariz. 85033

[21] Appl. No.: 820,840

[22] Filed: Aug. 1, 1977

[51] Int. Cl.$^2$ .......................... F03G 3/00; F01K 25/08
[52] U.S. Cl. ......................................... 60/675; 60/641; 60/531; 60/692
[58] Field of Search ................. 60/641, 651, 671, 670, 60/531, 675, 690, 692

[56] References Cited

U.S. PATENT DOCUMENTS

| | | | |
|---|---|---|---|
| 2,513,692 | 7/1950 | Tubbs | 60/531 |
| 3,509,716 | 5/1970 | Avery | 60/531 X |
| 3,785,144 | 1/1974 | Fairbanks | 60/531 |

Primary Examiner—Allen M. Ostrager
Attorney, Agent, or Firm—Gregory J. Nelson

[57] ABSTRACT

A vapor or thermal engine which converts heat energy to mechanical energy. A rotor has a main shaft which supports a plurality of vapor chambers communicating with a condenser across appropriate check valves and rotary valves to form a closed loop system. Fluid in the vapor chambers is vaporized and discharged as a high pressure gas to the condenser and returned as a liquid to the rotor imparting rotational movement to the rotor. Means may be associated with the condenser for extracting heat. A turbine or other rotary machine for producing mechanical energy is driven by the high pressure gas.

11 Claims, 6 Drawing Figures

THERMAL ENGINE

BACKGROUND OF THE INVENTION

The present invention relates to a thermal energy device. More particularly, the present invention relates to a thermal energy device characterized as a vapor or thermal engine which derives power by utilizing a working fluid which can be vaporized at relatively low temperatures and condensed by thermal variations or temperature differences.

Vapor engines, engines of the type from which power is derived from the alternate expansion and contraction of a fluid medium that can be vaporized and condensed at relatively low temperatures can be found in the prior art. Generally, these vapor engines are constructed by providing a rotatably mounted frame supporting a plurality of expansion chambers, which are alternately immersed and withdrawn from a fluid medium which is a source of heat. The fluid medium is ordinarily water. Within each expansion chamber is a quantity of relatively volatile liquid which vaporizes at a temperature below that of the surrounding fluid medium. By and large, these prior art vapor engines are generally complex and due to their complexity are not efficient or are not practical.

With the world-wide depletion of fossil fuels, utilization of other energy sources has become critical. Much emphasis has been placed on the utilization of solar energy. Solar radiation, sunlight, represents a vast energy source. The rate at which the earth receives energy from the sun, expressed in terms of heat energy according to the "solar constant" is 1.938 calories per square centimeter per minute. It is estimated that the amount of solar energy directed by the sun upon the earth in just three days in equivalent to the earth's total supply of all fossil fuels.

Other areas of research and investigation have been directed to utilizing energy sources such as geothermal energy. The present invention can be utilized with various sources of heat for energy such as those mentioned, which can be extracted and converted to mechanical energy.

As mentioned above, solar engines or thermal devices are well known for producing mechanical movement through the vaporization and condensation of a volatile liquid. Reference is made to U.S. Pat. No. 3,509,716 in which a plurality of tanks are arranged in a circumferential path. Each diametric pair of tanks are interconnected by a fluid passage. The circumferential array of tanks is disposed for rotation in a vertical plane, the tanks containing a volatile liquid. The lower tank of each pair is heated by solar means, while the upper tank is cooled by a water spray. The liquid in the lower tank is heated and vaporized and rises through interconnecting passages to the upper tank. Upon cooling, the vapor is condensed. The presence of liquid in the upper tank and the vapor in the corresponding lower tank causes an imbalance and imparts rotation to the structure.

A similar solar powered structure is shown in U.S. Pat. No. 1,911,456, in which one or more pairs of bulbs are in fluid interconnection and contain a volatile liquid. One bulb of each pair of bulbs is protected from solar energy, while the other of the bulbs is exposed to solar energy. The exposed bulb becomes heated and forces the liquid through an interconnecting passage to the opposite bulb creating a mechanical imbalance.

Other patents showing vapor motors of the general type are U.S. Pat. Nos. 3,659,416 and 3,984,985.

SUMMARY OF THE INVENTION

In accordance with the present invention, a thermal or vapor engine is provided which is simple in construction and utilizes a temperature differential to convert heat energy to mechanical or other forms of energy. The temperature differential may be obtained by utilizing solar, geothermal, conventional fuel, or other heat sources. The novel thermal engine comprises a rotor having oppositely disposed longitudinal vapor chambers arranged about a shaft for rotation with the shaft. Opposite ends of the chambers are connected to fluid passageways at opposite ends of the shaft by suitable tubular conduits across one-way check valves. The system contains a suitable volatile working fluid, as for example, one of the fluorinated hydrocarbons typically used as refrigerants. During a portion of the rotative cycle, the vapor chambers are exposed to a heat source, such as hot water which may be heated on conventional solar panels. The working volatile fluid is heated at this point in the operational cycle. The vaporization causes an attendant increase in pressure in the vapor chamber, causing the appropriate check valve to open and the vapor is discharged from the chamber and across a first rotary valve associated with the main shaft. The evacuation of a chamber will cause an imbalance, imparting rotation to the rotor and shaft. The vapor is removed and is condensed to a liquid and returned to the vapor chambers across a second rotary valve. Condensation may take place by extracting heat from the working fluid immersed in a liquid bath. Heat may be removed from the liquid bath by use of a rotatable vapor wheel having a plurality of similar, tubular fluid-containing spokes extending between the periphery of two spaced apart peripheral wheels. The wheel and spokes are disposed for rotation in a vertical plane. Volatile liquid in the lower portion of the wheel is heated by the water bath in the condenser tank. The volatized fluid rises through the interconnecting passages in the presence of liquid in the upper spokes causing a mechanical imbalance and imparts rotation to the unit. Cooling is achieved as heat is withdrawn from the condenser bath to vaporize the working fluid within the wheel. The rotor and vapor wheel may be interconnected by a drive chain.

BRIEF DESCRIPTION OF THE DRAWINGS

The above and other objects and advantages of the present invention will become apparent from the following specification, claims and drawings in which:

DETAILED DESCRIPTION OF THE INVENTION

Figure 1:
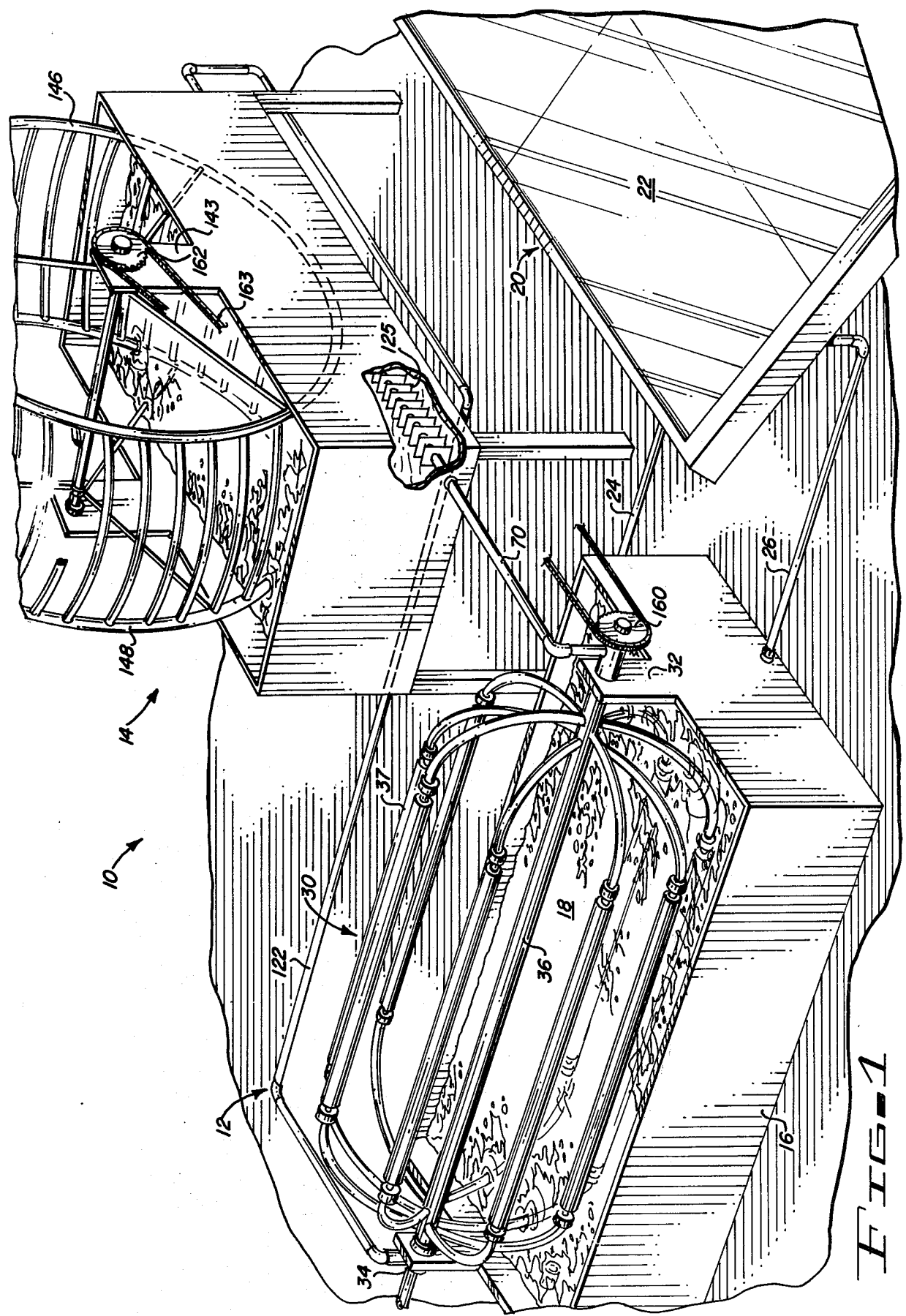
FIG. 1 is a perspective view of a preferred embodiment of the thermal engine of the present invention.
Figure 2:
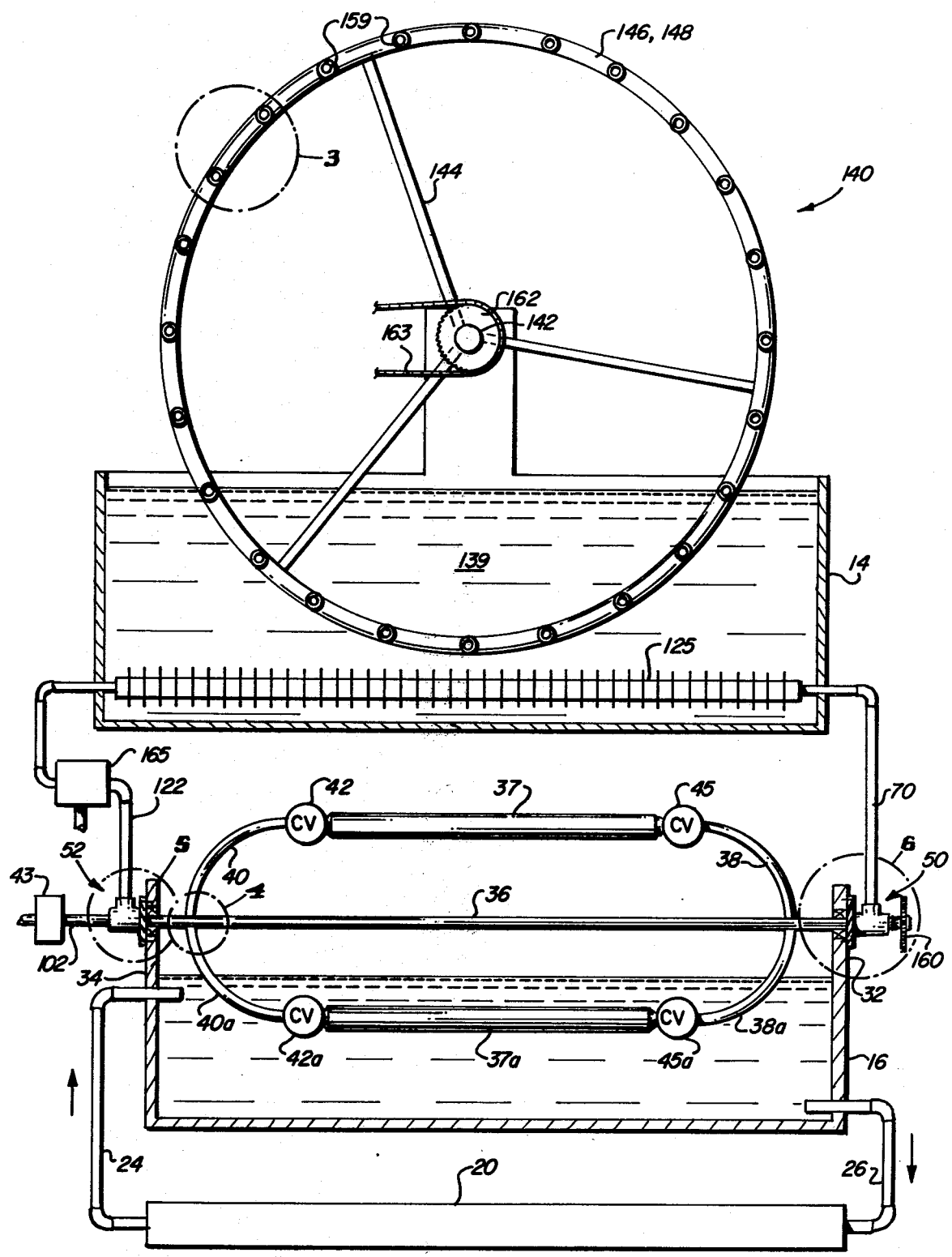
FIG. 2 is a sectional elevational view of the vapor or thermal engine of the present invention with the components rearranged for convenience.

Referring now to the drawings, the thermal engine of the present invention generally designated by the numeral 10 and, as best shown in FIGS. 1 and 2, includes an evaporator section 12 in a condenser unit 14. Evaporator unit 12 is shown as comprising a generally rectangular tank 16, containing a liquid 18, such as water. The heat energy available in liquid 18 serves as a source of energy for the device.

As shown in FIG. 1, the liquid 18 is heated by means of solar panels 20. The solar panels 20 may be any conventional construction, such as flat plate panels, having a light transparent surface 22 exposed to solar radiation. The surface 22 may be glass or may be a lens of the Fresnel type. Solar energy passes through the panel and ultra violet energy is converted to heat energy and retained within the panel. Water to be heated may be trickled across the interior surfaces of the panels 20 or may be trickled across the interior surfaces of the panels 20 or may be passed through an appropriate heat exchanger within the panel.

Heated water from the solar unit is delivered to tank 16 via line 24. Water to be heated is removed from tank 16 via line 26 and introduced into the solar unit 20. Note that pumps, motors, controls and the like have been omitted for clarity, it being understood that these are more or less conventional. Similarly, the detailed construction of the solar panels is not set forth, as these features are well known.

It may also be desirable to mount the solar panels in conjunction with an appropriate heliostatic tracking device so that the surfaces 22 of the solar panels 20 are exposed to the greatest amount of solar radiation. It will also be understood that in addition to solar energy for heating the liquid within tank 16, other than natural sources of power are available. For example, water from a natural source, such as a hot springs or other geothermal source can be used. In some instances, waste heat from industrial or other processes may be used to heat the water in the tank. In other instances, direct utilization of solar energy concentrated by use of reflectors or parabolic mirrors may be used to provide the necessary heat gradient.

A power rotor 30 is mounted for rotation above evaporator tank 16. A pair of bearing support assemblies 32 and 34 are disposed at opposite ends of tank 12. A main rotor shaft 36 is disposed for rotation within bearing supports 32 and 34 extending longitudinally above the liquid level in tank 16. Shaft 36 supports the power rotor 30. A power take off unit 43 is connected to the left end of shaft 36.

Figure 6:
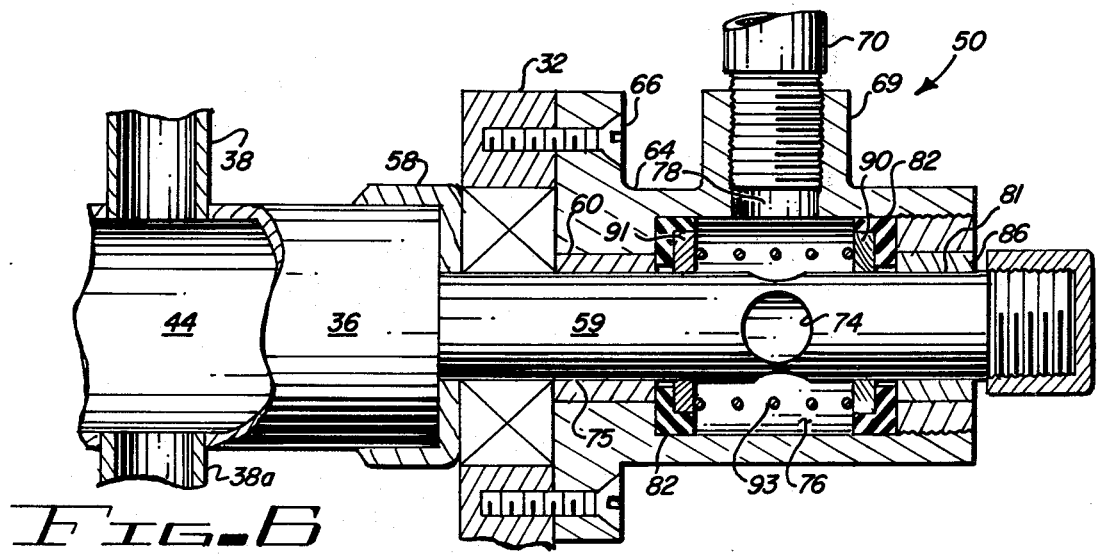

Power rotor 30 comprises a plurality of pairs of longitudinal vapor chambers 37 and 37a oppositely disposed about shaft 36. The appended letter "a" denotes components of the rotor in a position below shaft 36. The right ends of shaft 36, best seen in FIG. 6, is configured having a hollow passageway 44. The right end of vapor chambers 37 and 37a, as viewed in FIG. 2, communicate with the hollow section 44 of shaft 36 by interconnecting tubes 38 and 38a, respectively. One-way check valves 45 and 45a are interposed, respectively, between chamber 37 and tube 38 and chamber 37a and tube 38a.

The opposite end of vapor chambers 37 and 37a are similarly in communication with hollow passageway or section 48 at the left end of shaft 36 by means of tubes 40 and 40a across check valves 42 and 42a, respectively.

Check valves 45 and 45a are one-way valves permitting flow only from tubes 38 and 38a respectively into vapor chambers 37 and 37a. Similarly, check valves 42 and 42a are one-way check valves permitting flow only from vapor chambers 37 and 37a into the associated tube 40 and 40a. It will be obvious that any number of pairs of vapor chambers may be oppositely connected as shown in FIG. 2. For convenience, three pairs, spaced 120° apart, have been shown.

Figure 4:
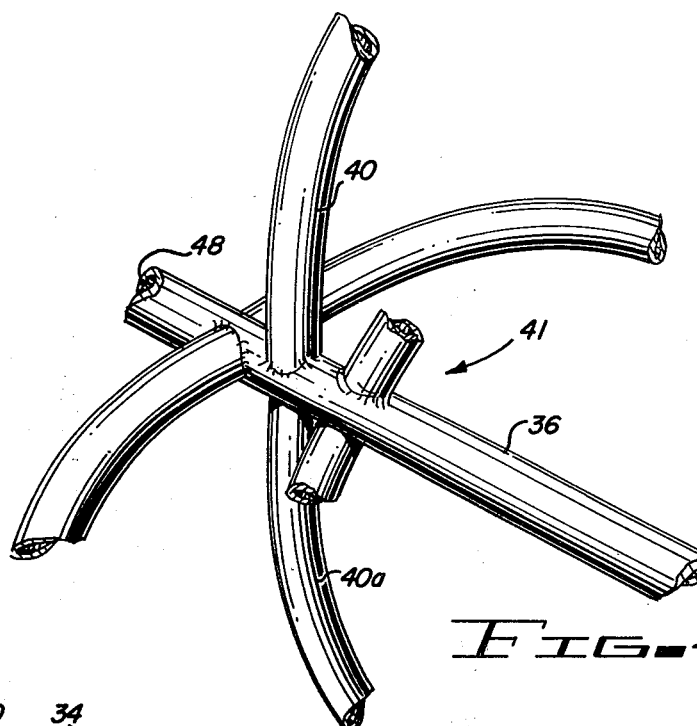
FIG. 4 is a detailed view showing a portion of the construction of the vapor wheel.

FIG. 4 illustrates in greater detail the interconnection of the tubing 40 and 40a to the main shaft 36 at passageway 48 at what is termed manifold section 41. The construction of the manifold section at the interconnection of tubing sections 38 and 38a to the passageway 44 is similarly constructed and need not be described in further detail.

Condenser tank 14 communicates with shaft section or passageway 44 via line 70 across rotary valve assembly 50. Valve assembly 50 is shown in greater detail in FIG. 6. As discussed in detail above, the right end of shaft 36 defines a hollow section 44 which communicates with interconnecting tubing 38 and 38a leading to the respective vapor chambers. Shaft 36 is rotatively mounted in bearing support 32. The end section of shaft 36 adjacent bearing support 32 is fitted with a reducer 58 which extends through the bearing support. A housing 64 defines a chamber 76 which communicates with opening 74 in the longitudinal extension 59 of reducer 58. Housing 64 is secured to bearing support 32 by means of screws 66. Conduit 70 is screwed or otherwise secured to fitting 69 in communication via passageway 78 with chamber 76. Longitudinal bores 75 and 81 are provided in housing 64 at either side of chamber 76. Bores 75 and 81 have a diameter slightly larger than extension 59. Appropriate bushings, such as bronze bushings 60 and 86 are inserted in bore 75 and 81 and rotatively support shaft extension 59. An L-shaped elastomeric member 82 is inserted at the inner end of bushings 60 and 81 engaging shaft 59. Sealing rings 91 are placed in abutment with elastomeric members 82 and are held in place by an appropriate spring 93. Sealing rings 91 may be ceramic and carbon for proper wear and resistance to attack by the working fluid. It will be apparent that working fluid delivered through line 70 from the condenser 14 will be delivered to the interior passageway 44 in shaft 36 and be introduced to the vapor chambers by the appropriate interconnecting tube 38a.

Figure 5:
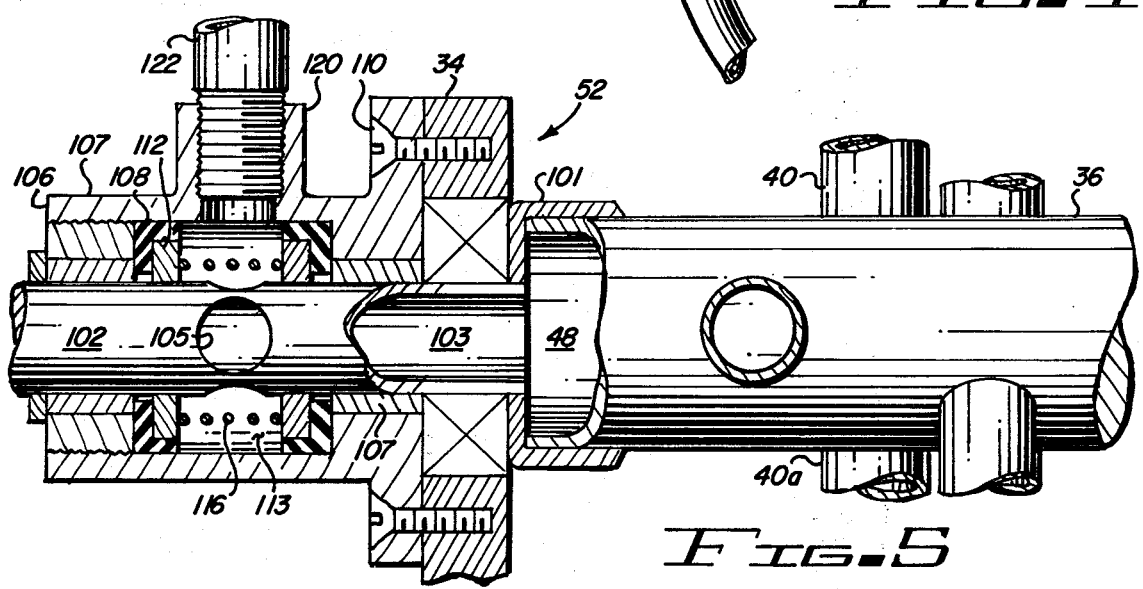
FIG. 5 and 6 illustrate partial sectional views of the rotary valve assemblies located at opposite ends of the rotor shaft.

The left end of shaft 36 as viewed in FIG. 2, is also provided with a rotary valve assembly 52, similar in construction to valve assembly 50. Rotary valve 52 is shown in detail in FIG. 5. The left end of shaft 36 defines a blind passageway 48. As seen in FIG. 5, shaft 36 is provided with a reducer 101 having an axial extension 102. Extension 102 defines a hollow section 103 which is provided with a central opening 105. Shaft section 102 is supported for rotation in bearing support 34 by screws or other fasteners 110. Housing 107 defines a chamber 113 which communicates with passage 103 by means of opening or aperture 105. Bushings 106 support shaft extension 102 for rotation. Elastomeric seals 108 engage the inner edges of the bushings and are contained within housing 107. Ceramic and carbon sealing rings 112 are held in place by coil spring 116 in a manner as has been described with reference to FIG. 6. An appropriate rotary device such as a turbine 165 is interposed in line 122 and driven by the high pressure vapor. Power may also be taken directly from shaft 36 at power take-off unit 43. Because of the similarity of construction, further detailed discussion is not believed necessary.

Housing 107 defines a threaded outlet 120 which is provided with internal threads for reception of conduit 122. Conduit 122 communicates with heat exchanger 125 contained within condenser tank 14. The opposite end of heat exchanger 125 communicates with conduit 70 which discharges into rotary valve 50.

Condenser tank 14 contains a suitable liquid 139 to immerse heat exchanger 125 and promote extraction of heat from working fluid flowing through the heat exchanger 125. Means are provided to extract heat from the fluid 139. A vapor wheel 140 is shown for this purpose. Vapor wheel 140 is mounted on a horizontal shaft 142 suitably supported on frame 143 for rotation. Two spaced apart hollow rims 146 and 148 which are supported on spokes 144 for rotation about shaft 142. Curved cross pieces or cylindrical conduits 159 interconnect the circular wheels 146 and 148. The entire wheel is filled with a suitable working fluid. The working fluid may be propane, butane, methylchloride or one of the fluorinated hydrocarbons used as refrigerants, such as dichlorotetrafluoroethane, dichlorodifluoromethane or monochlorodifluoromethane.

Figure 3:
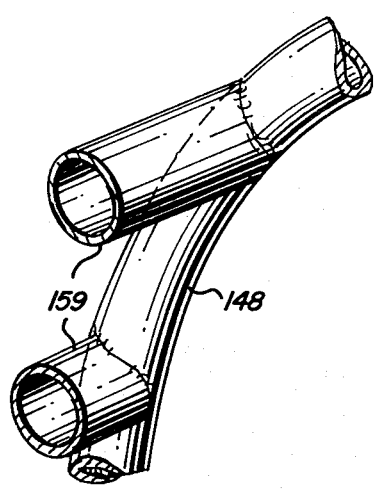
FIG. 3 is a detailed view showing the construction of a portion of the condenser cooling wheel.

FIG. 3 shows in detail the interconnection of the cross pieces or tie rods 159 and the circular wheels 146 and 148. Note that the working fluid within the wheel is free to flow through the wheel to any of the cross pieces or tie rods.

A sprocket 162 is secured to shaft 142. Sprocket 160 is keyed or otherwise secured to main shaft 36 of the rotor 30. The sprockets 162 and 160 are interconnected by a drive chain 163.

A more complete understanding of the present invention will become apparent from the following description of operation.

The evaporator tank 16 contains a source of heat energy. As shown, evaporator tank 16 receives water which has been heated in solar unit 20 and introduced into tank 16 by means of conduit 24. Cool return water from evaporator tank 16 is returned to the solar heating unit via line 26. As pointed out above, other heat sources may be used such as geothermal energy. Power rotor 30 is mounted for rotation so that during a portion of the rotational cycle, the vapor chambers 37a are brought into the influence of the heat source. As the vapor chambers 37 are immersed in the hot fluid, the working fluid within the vapor chambers is vaporized increasing the pressure within the chambers. The working fluid is chosen, having selected characteristics including a relatively low boiling point. As the pressure increases to a predetermined point, the associated check valve 42a opens and vapor is discharged from the lower vapor chamber 37a across check valve 42a and tube 40a into shaft chamber 48 through passage 103 into condenser tank 14 via line 122.

The vapor is expanded across turbine 165 driving the device so that mechanical power is available at the output shaft of the turbine.

The vaporized working fluid then flows through heat exchanger 125. Heat exchanger 125 may be finned as shown, to increase the heat transfer characteristics of the exchanger. Cooling and condensation occurs as the working fluid passes through heat exchanger 125 and the working fluid is condensed and returned to rotary valve 50 via line 70 in a closed loop system. The condensed working fluid is introduced into shaft chamber 44 and flows via line 38a across check valve 45a to vapor chamber 37a. The volume of liquid entering into the lower vapor chambers 37a creates an imbalance which causes the entire vapor wheel or rotor 30 to turn. It is also believed that as the vapor flows from the vapor chamber as the pressure increases, the evacuation of the chamber tends to result in a vacuum effect which also contributes to the rotational effect of the vapor wheel 30. The system is a closed loop system so system pressure builds and promotes flow with the operation of the check valves preventing the system from stabilizing at an equilibrium condition.

Cooling wheel 140 operates in a similar manner. The volatile working fluid within the wheel is heated when submerged within the liquid 139 within condenser tank 14. The liquid within condenser tank 14 extracts heat from the working fluid within heat exchanger 125. The working fluid within wheel 140 vaporizes and tends to rise to a higher level within the wheel through the rim, eventually entering, collecting and condensing in the curved central section of one of the axial spokes. When the vapor is condensed, a rotational effect is imparted due to the imbalance in the wheel. Obviously, other methods of cooling could be used, such as, water spray, or directing a flow of air across heat exchanger 125.

The mechanical interconnection of wheel 140 and rotor 30 by drive chain 163 serves as a governor and also imparts a "flywheel" effect so the rotor 30 operates smoothly and continually.

As shaft 36 is caused to rotate, power take off unit 43 is actuated. Power take off unit 43 may be any conventional gear device. Unit 43 may be used to drive any suitable apparatus, such as, an electrical generator. An alternative power take off unit 43 might be a speed changer for increasing the rotational speed across the unit. In this event, the output shaft of unit 43 can be connected to an appropriate apparatus by means of a coupling.

The pressurized vapor discharged from the rotor is also expanded across turbine 165 to drive the turbine. Turbine 165 can be connected to drive a generator or other device.

From the foregoing, it will be obvious that the invention is of simple construction which can be readily implemented from a variety of well known, conveniently available materials to provide a highly efficient vapor engine. It will be appreciated that the rotor and vapor wheel can be constructed in various configurations and that the heating and cooling can be achieved by various sources. Various changes and alterations and modifications will be apparent to those skilled in the art. To the extent that these various modifications do not depart from the spirit and scope of the attendant claims, they are intended to be encompassed therein.

What is claimed is:

1. A thermal engine adapted to convert heat energy from a heat source to mechanical energy comprising:
 (a) a power rotor including:
  (i) a main shaft mounted for rotation;
  (ii) at least one pair of vapor chambers disposed about said shaft and supported thereon, said vapor chambers having an inlet and an outlet;
 (b) condenser means;
 (c) conduit means connecting the inlet and the outlet of said vapor chambers to said condenser forming a closed loop containing a working fluid;
 (d) check valve means associated with said conduit means permitting flow only from said outlet to said condenser and return to said inlet whereby the working fluid in a vapor chamber at a predetermined rotative position of the rotor is heated and vaporized by said heat source and thereafter condensed and returned to the vapor chamber imparting rotation to said rotor.

2. The thermal engine of claim 1 wherein said heat source comprises a heated fluid and wherein said rotor is immersed in said fluid at least during a portion of the rotational cycle.

3. The thermal engine of claim 2 wherein said heated fluid is heated by solar energy means.

4. The thermal engine of claim 2 wherein said condenser comprises a heat exchanger submerged in a cooling liquid and further including means to extract heat from said liquid.

5. A thermal engine adapted to convert heat energy from a heat source to mechanical energy comprising:
   (a) a power rotor including:
      (i) a generally axial shaft mounted for rotation, said shaft defining first and second fluid passages;
      (ii) at least one pair of vapor chambers oppositely disposed about said shaft, said vapor chambers having an inlet end and an outlet end;
      (iii) first conduit means connecting the inlets of said vapor chambers to said first fluid passage;
      (iv) second conduit means connecting the outlets of said vapor chambers to said second fluid passage;
      (v) check valve means interposed in said first and second conduits to permit flow only into the vapor chambers across said inlet and from the vapor chambers across said outlet;
   (b) condenser means;
   (c) a first rotary valve on said shaft and providing hydraulic communication with said first fluid passage;
   (d) a second rotary valve on said shaft providing hydraulic communication with said second fluid passage;
   (e) conduits interconnecting said first and second rotary valves to said condenser to form a closed loop system containing a volatile working fluid whereby the working fluid in a vapor chamber is heated at a predetermined rotative position of the rotor and is vaporized and passed through said first passage and across said first valve to the condenser and is thereafter condensed and returns to the vapor chamber via said second valve and fluid passage thereby imparting rotation to the rotor.

6. The thermal engine of claim 5 wherein said heat source comprises a heated fluid and wherein such rotor is immersed in said fluid at least during a portion of the rotational cycle.

7. The thermal device of claim 6 wherein said heated fluid is heated by solar energy.

8. The thermal device of claim 5 wherein said condenser includes a liquid reservoir and heat is extracted therefrom by a rotatively mounted vapor wheel.

9. The thermal device of claim 5 wherein power take off means are associated with said shaft.

10. The thermal device of claim 5 wherein a rotary device is interposed in the conduit delivering vaporized fluid to said condenser and said vaporized fluid is expanded across said rotary device.

11. The thermal device of claim 8 wherein said vapor wheel and power rotor are mechanically interconnected.

* * * * *